No. 670,315. Patented Mar. 19, 1901.
W. H. EYNON.
DUMPING VEHICLE.
(Application filed Dec. 29, 1900.)
(No Model.) 2 Sheets—Sheet 1.
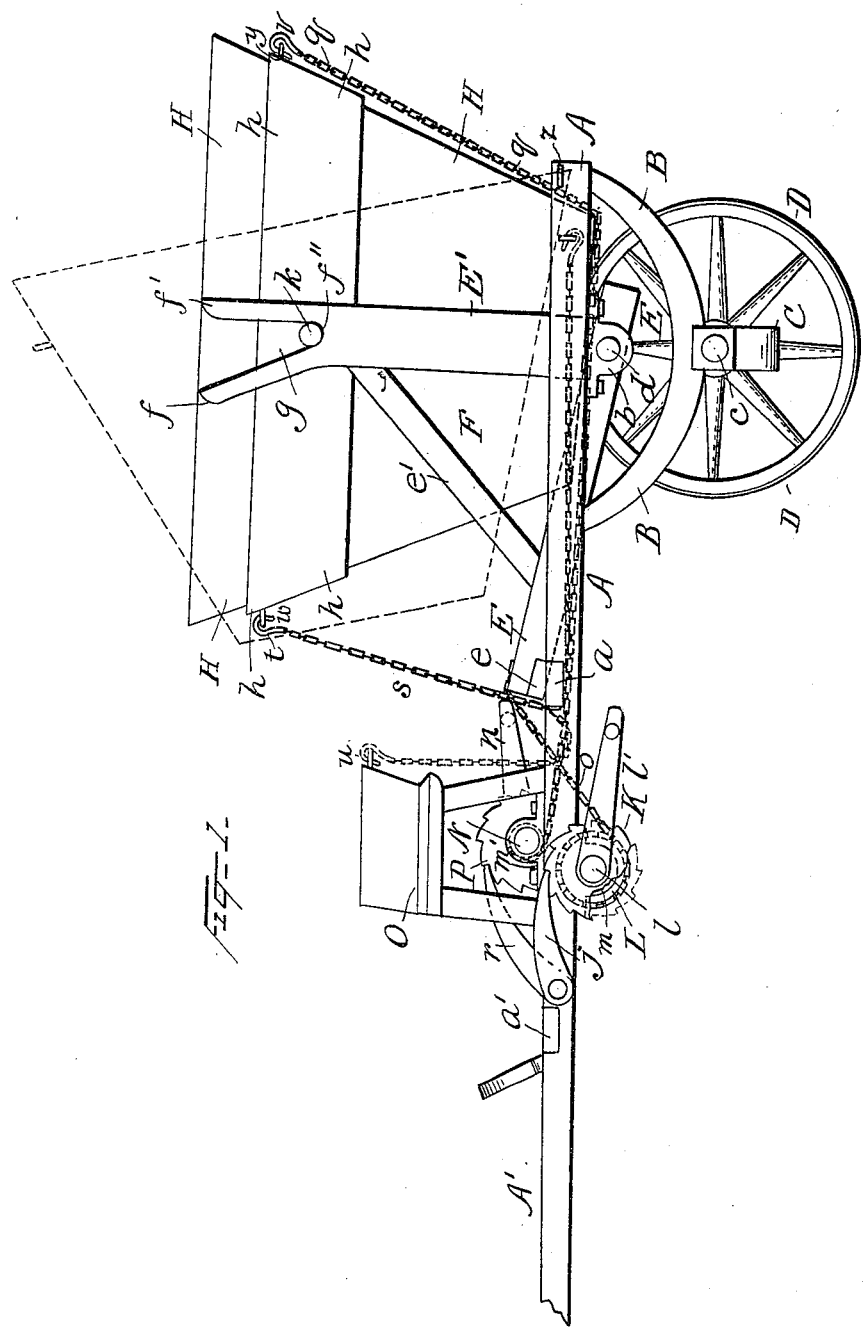
Witnesses
Norris A. Clark
J. E. ......
Inventor
W. H. Eynon
By E. B. Clark
Attorney

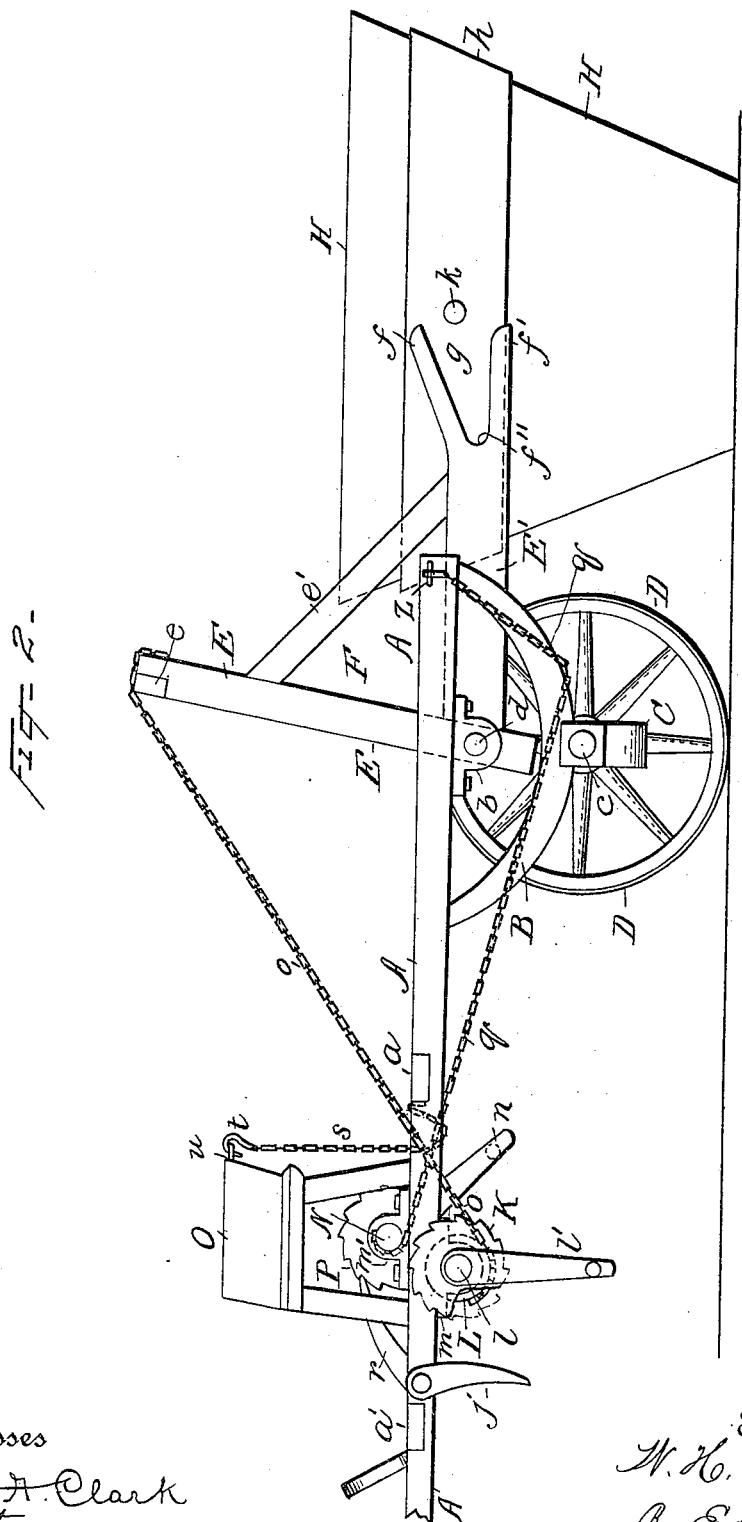

UNITED STATES PATENT OFFICE.

WILLIAM H. EYNON, OF NILES, OHIO, ASSIGNOR OF ONE-HALF TO D. F. ANDERSON, OF YOUNGSTOWN, OHIO.

DUMPING-VEHICLE.

SPECIFICATION forming part of Letters Patent No. 670,315, dated March 19, 1901.

Application filed December 29, 1900. Serial No. 41,487. (No model.)

*To all whom it may concern:*

Be it known that I, WILLIAM H. EYNON, a citizen of the United States, residing at Niles, in the county of Trumbull and State of Ohio, have invented certain new and useful Improvements in Dumping Carts or Wagons; and I do hereby declare the following to be a full, clear, and exact description of the invention, such as will enable others skilled in the art to which it appertains to make and use the same.

This invention relates to dumping carts or wagons adapted particularly for collecting refuse or other material at numerous detached stations or localities where a detachable receptacle may be placed for the purpose.

The object of my invention is to provide for placing detached receptacles or the body portions of dumping carts or wagons in convenient places on the ground or floor level to be filled with refuse or other material, and devices on the vehicle adapted to quickly engage with a detached receptacle or body which has been filled and raise it into position on the vehicle, so that it may be hauled to the dumping-station or any place of discharge or storage.

By means of my invention a number of detachable body-receptacles may be used with one wheeled vehicle and placed at a low level and filled with material as occasion requires, or to suit the convenience of the workmen, without the usual labor of shoveling material by hand up to the comparatively high level of the cart or wagon body.

The novel and distinguishing features of my invention are a detachable body-receptacle and a tilting or rocking frame on the vehicle adapted for engaging with the body-receptacle when in the detached position on the ground or floor level, and by means of suitable operating mechanism raising it into position on the vehicle ready to be hauled to the place of discharge.

I will now describe the details of construction of my invention by reference to the accompanying drawings, in which—

Figure 1 represents a side elevation of the dumping-cart with one wheel removed and with the detachable body-receptacle in elevated position. Fig. 2 represents a similar view showing the body-receptacle in the lowered position and the tilting or rocking frame adjusted to engage with the body for raising it onto the vehicle.

The side bars A of the vehicle-frame are connected near the front by cross-bars $a$ $a'$ and may have forward extensions A', forming the shafts. The bars A are connected near their rear ends by means of the supporting-braces B, one on each side, and the axle C, which is purposely dropped or bent downward to be out of the way of the body-receptacle when it is raised or lowered or turned for dumping its load. The wheels D are applied to the spindle $c$ of the axle in the usual manner. The tilting or rocking frame F is constructed of two lateral lever-bars E and two standards E', secured together at nearly right angles near the rear ends of the bars E and are strengthened by the braces $e'$, one on each side of the frame. The lever-bars E are also connected at their front ends by the cross-bar $e$, which rests on the cross-bar $a$ when the standards are upright, as in Fig. 1. At the junction of bars E and standards E' is secured a lateral journal $d$, having its bearing in the box $b$, secured to the side bar A on each side of the cart. The standards E' are provided at their outer ends with forks $f$ $f'$, forming between them in each standard a deep notch $g$. A curved semicircular bearing $f''$ is formed at the angle of the forks to receive the lateral pin or journal $k$ on each side of the body-receptacle H. The divergent forks $f$ $f'$ facilitate engagement of the standards with the journals when the receptacle is in the detached position on the ground-level, as shown in Fig. 2.

The body-receptacle H is preferably made hopper-shaped—that is, with a narrow bottom, flaring front and rear end walls, and a wide top, as shown. It may be made of sheet metal, and a strengthening-band $h$ is preferably applied near the top. Midway between the flaring ends on the vertical sides the lateral pins or journals $k$ are secured to the band or other part of the body H for supporting it in its bearings $f''$ in the standards E'.

The operating mechanism for the rocking frame F and for turning the body H in its journal-bearings is placed at the front of the vehicle-frame and may be under the seat, as shown. A winch, consisting of a shaft $l$, journaled in a box $m$ on the under side of each bar A, a winding-drum L and a ratchet-wheel K on the shaft, and a rope or chain $o$, attached at one end to the drum and at the other end to the cross-bar $e$, serves to tilt or rock the frame F forward from the position shown in Fig. 2 to the position shown in Fig. 1. The body-receptacle H being filled with material, the forks of the standards are made to engage with the trunnions or journals $k$, as indicated in Fig. 2, and the chain $o$ is then wound on drum L by turning handle $l'$ till the lever-bars F are drawn down upon the cross-bar $a$, as shown in Fig. 1. The pivotal pawl $j$, engaging the ratchet-wheel K, will prevent the winch from turning backward, and the rocking frame will thus be held in position.

In order to turn the receptacle H in its bearings for dumping its load, as indicated by dotted lines in Fig. 1, a chain $q$ is attached by its hook $v$ to an eye or staple $y$ in the rear end of body H and wound upon a second winch composed of shaft N in boxes $m'$, ratchet-wheel P, handle $n$, and pawl $r$. The ratchet-wheel and handle of this winch are preferably placed on the opposite side of the cart from those of the first winch. The chain $q$ is passed centrally below the receptacle H and attached to the shaft P of the winch. The receptacle H may be turned still farther than the position indicated in dotted lines, if required, in the dumping operation. For the purpose of holding the receptacle against swinging or tilting when the cart is in motion a chain $s$, attached to the frame of the cart, is connected by its hook $t$ to an eye or staple $w$ in the front end of the receptacle. The chain $q$ being then hooked into staple $y$ and wound by the winch till taut, the receptacle will be secured in place. Other locking or holding devices may be used. When the chain $s$ is disengaged from the receptacle, it may be hooked into staple $u$ on the back of seat O. The chain $q$ when out of use will be hooked into staple $z$ at the rear end of side bar A. The seat O may be secured by its legs to the side bars A in any convenient manner.

Since the flaring ends of the receptacle H are alike, no attention need be given to the question of the front or rear end when engaging the receptacle by the forked standards to elevate it upon the cart.

My dumping-cart is adapted for use in various kinds of work—such, for instance, as street-cleaning, wherein the detached body-receptacles could be placed at various convenient stations for receiving refuse and when filled could be raised onto the cart and hauled to the dump.

Having described my invention, what I claim as new, and desire to secure by Letters Patent, is—

1. In a dumping cart or wagon, the tilting or rocking frame on the vehicle, having standards E' provided with notched outer ends $g$, and adapted to be swung from a vertical, to a horizontal position, or vice versa, in combination with a detachable body-receptacle having lateral journals adapted to be engaged by said notched standards, and operating mechanism connecting with the tilting frame for swinging the standards and the engaged receptacle into the raised position, substantially as described.

2. In a dumping cart or wagon, the combination with the tilting or rocking frame on the vehicle, having supporting-standards E' provided with notched outer ends $g$, for engaging with journals or pins, of a detachable body-receptacle having lateral journals or pins, mechanism for swinging said frame, a winding drum or winch journaled in the frame of the vehicle, having an attached chain and hook for engaging with the rear end of the receptacle for turning it in the dumping operation, and separate means attached to the vehicle-frame for engaging with the front of the receptacle to hold it in place, substantially as described.

3. In a dumping cart or wagon, the combination with the tilting or rocking frame having standards with notched outer ends $g$, and the body-receptacle supported therein, of a winding-drum and connections for operating the tilting frame to raise the body-receptacle from the ground, and a separate winding drum or winch and suitable connections with the receptacle for turning it in the notched bearings of the standards to dump its load, substantially as described.

In testimony whereof I affix my signature in presence of two witnesses.

WILLIAM H. EYNON.

Witnesses:
J. N. BALDWIN,
A. J. WOOLF.